(12) United States Patent
Anderson et al.

(10) Patent No.: US 8,480,066 B2
(45) Date of Patent: Jul. 9, 2013

(54) HEAD GIMBAL ASSEMBLY ALIGNMENT WITH COMPLIANT ALIGNMENT PIN

(76) Inventors: Ronald E. Anderson, Lakeville, MN (US); Brett R. Herdendorf, Mound, MN (US)

( * ) Notice: Subject to any disclaimer, the term of this patent is extended or adjusted under 35 U.S.C. 154(b) by 670 days.

(21) Appl. No.: 12/546,551

(22) Filed: Aug. 24, 2009

(65) Prior Publication Data

US 2011/0043949 A1 Feb. 24, 2011

(51) Int. Cl.
*B23Q 3/18* (2006.01)

(52) U.S. Cl.
USPC .............................. 269/58; 269/67

(58) Field of Classification Search
USPC ...... 269/58, 67, 69, 53; 29/603.03; 360/245.2
See application file for complete search history.

(56) References Cited

U.S. PATENT DOCUMENTS

| | | |
|---|---|---|
| 2,971,179 A | 2/1961 | Heuer |
| 4,468,074 A | 8/1984 | Gordon |
| 4,520,555 A | 6/1985 | Gyi et al. |
| 4,645,280 A | 2/1987 | Gordon et al. |
| 4,766,371 A | 8/1988 | Moriya |
| 5,198,945 A | 3/1993 | Blaeser et al. |
| 5,496,182 A | 3/1996 | Yasumura |
| 5,675,082 A | 10/1997 | Marr et al. |
| 5,682,780 A | 11/1997 | Girard |
| 5,786,677 A | 7/1998 | Marr |
| 5,844,420 A | 12/1998 | Weber et al. |
| 5,896,735 A | 4/1999 | Wirtz |
| 5,913,687 A | 6/1999 | Rathburn |
| 5,938,451 A | 8/1999 | Rathburn |
| 6,034,851 A | 3/2000 | Zarouri et al. |
| 6,125,003 A | 9/2000 | Tsuda et al. |
| 6,132,554 A | 10/2000 | Traise et al. |
| 6,135,783 A | 10/2000 | Rathburn |
| 6,140,661 A | 10/2000 | Nodelman |
| 6,163,950 A | 12/2000 | Bodiker, II et al. |
| 6,178,629 B1 | 1/2001 | Rathburn |
| 6,229,303 B1 | 5/2001 | Guzik |
| 6,229,304 B1 | 5/2001 | Guzik |
| 6,231,353 B1 | 5/2001 | Rathburn |
| 6,242,910 B1 | 6/2001 | Guzik et al. |
| 6,247,938 B1 | 6/2001 | Rathburn |
| 6,255,750 B1 | 7/2001 | Mohajerani et al. |
| 6,307,467 B1 | 10/2001 | Starkey et al. |
| 6,378,195 B1 | 4/2002 | Carlson |
| 6,459,260 B1 | 10/2002 | Bonin et al. |
| 6,483,670 B1 | 11/2002 | Watanabe |
| 6,487,028 B1 | 11/2002 | Sri-Jayantha et al. |
| 6,512,367 B2 | 1/2003 | Liu et al. |

(Continued)

*Primary Examiner* — Basil Katcheves
(74) *Attorney, Agent, or Firm* — Braden Katterheinrich

(57) ABSTRACT

This disclosure includes a system for aligning an unmounted head gimbal assembly (HGA) comprising a platform for a base plate of the HGA. The platform defines an X-Y plane. The system further comprises a compliant alignment pin extending beyond the platform in a Z-dimension perpendicular to the X-Y plane. The compliant alignment pin includes a tapered portion having a maximum diameter larger than a diameter of a boss hole in the base plate of the HGA. The compliant alignment pin is deflectable in the Z-dimension to allow the base plate of the HGA to register with the platform. The system further comprises a second alignment pin extending beyond the platform in the Z-dimension. The second alignment pin is configured to register with an HGA reference feature of the HGA when the boss hole of the HGA registers with the compliant alignment pin to precisely align the HGA relative to the compliant alignment pin and the second alignment pin.

16 Claims, 4 Drawing Sheets

U.S. PATENT DOCUMENTS

| | | |
|---|---|---|
| 6,566,870 B2 | 5/2003 | Sorenson et al. |
| 6,572,396 B1 | 6/2003 | Rathburn |
| 6,580,572 B1 | 6/2003 | Yao et al. |
| 6,657,821 B1 * | 12/2003 | Jenneke ............... 360/245.2 |
| 6,704,165 B2 | 3/2004 | Kube et al. |
| 6,717,776 B2 | 4/2004 | Boutaghou |
| 6,789,659 B2 | 9/2004 | Spejna et al. |
| 6,801,387 B1 | 10/2004 | Rahman |
| 6,830,460 B1 | 12/2004 | Rathburn |
| 6,939,143 B2 | 9/2005 | Rathburn |
| 6,957,963 B2 | 10/2005 | Rathburn |
| 7,084,654 B2 | 8/2006 | Zhao et al. |
| 7,094,718 B2 | 8/2006 | Kwon et al. |
| 7,121,839 B2 | 10/2006 | Rathburn |
| 7,127,799 B2 | 10/2006 | Girard et al. |
| 7,141,969 B2 | 11/2006 | Guzik |
| 7,159,299 B1 | 1/2007 | McMunigal et al. |
| 7,345,840 B2 | 3/2008 | Gomez et al. |
| 7,379,265 B2 | 5/2008 | Wang et al. |
| 7,529,635 B2 | 5/2009 | Anderson et al. |
| 2002/0039253 A1 | 4/2002 | Imai et al. |
| 2002/0053590 A1 | 5/2002 | Lennard et al. |
| 2002/0069510 A1 | 6/2002 | Girard et al. |
| 2002/0075602 A1 | 6/2002 | Mangold et al. |
| 2003/0107839 A1 | 6/2003 | Smith |
| 2003/0179493 A1 | 9/2003 | Kim |
| 2003/0182788 A1 | 10/2003 | Fayeulle et al. |
| 2004/0213138 A1 | 10/2004 | Kim |
| 2005/0028353 A1 | 2/2005 | Kidachi et al. |
| 2005/0099763 A1 | 5/2005 | Rathburn |
| 2005/0101164 A1 | 5/2005 | Rathburn |
| 2005/0209797 A1 | 9/2005 | Anderson et al. |
| 2005/0233609 A1 | 10/2005 | Rathburn |
| 2006/0006895 A1 | 1/2006 | Zhao et al. |
| 2006/0033249 A1 | 2/2006 | Guzik et al. |
| 2006/0035483 A1 | 2/2006 | Rathburn et al. |
| 2006/0116004 A1 | 6/2006 | Rathburn |
| 2006/0160379 A1 | 7/2006 | Rathburn |
| 2007/0115593 A1 | 5/2007 | Yao |

* cited by examiner

HEAD GIMBAL ASSEMBLY ALIGNMENT WITH COMPLIANT ALIGNMENT PIN

TECHNICAL FIELD

The invention relates to testing head gimbal assemblies for disc drives.

BACKGROUND

Prior to installing a head gimbal assembly (HGA) into a hard disc drive, it is desirable to dynamically test the functionality of the read and write transducers that reside on the head gimbal assembly so that defective HGAs may be identified and sorted. Such testing can include preliminary activities to align, configure, and prepare the HGA for testing, followed by the actual electrical test of the HGA. Because HGAs are typically small, fragile, and contain sensitive electronic components, they are susceptible to mechanical stress, electro-static discharge (ESD), environmental contamination, and other handling-related issues.

Testing an HGA may include positioning the HGA adjacent to a rotating test disc and reading to and/or writing from the test disc with the HGA. Accurate positioning of the HGA adjacent to the test disc is required to reliably determine its suitability for inclusion in a disc drive. For example, performances of an HGA during read and write operations may be dependent on the location and skew of the HGA relative to the test disc.

Techniques for testing an HGA commonly include first mounting the HGA on an intermediate mounting fixture, and then placing the intermediate mounting fixture on a tester to precisely position the mounted HGA. For example, the HGA may be precisely positioned adjacent a test disc of the tester for dynamic electrical testing of the HGA.

SUMMARY

As example, this disclosure includes a system for aligning an unmounted head gimbal assembly (HGA) comprising a platform for a base plate of the HGA. The platform defines an X-Y plane. The system further comprises a compliant alignment pin extending beyond the platform in a Z-dimension perpendicular to the X-Y plane. The compliant alignment pin includes a tapered portion having a maximum diameter larger than a diameter of a boss hole in the base plate of the HGA. The compliant alignment pin is deflectable in the Z-dimension to allow the base plate of the HGA to register with the platform. The system further comprises a second alignment pin extending beyond the platform in the Z-dimension. The second alignment pin is configured to register with an HGA reference feature of the HGA when the boss hole of the HGA registers with the compliant alignment pin to precisely align the HGA relative to the compliant alignment pin and the second alignment pin.

These and various other features and advantages will be apparent from the description and drawings, and from the claims.

DETAILED DESCRIPTION

Figure 1A:
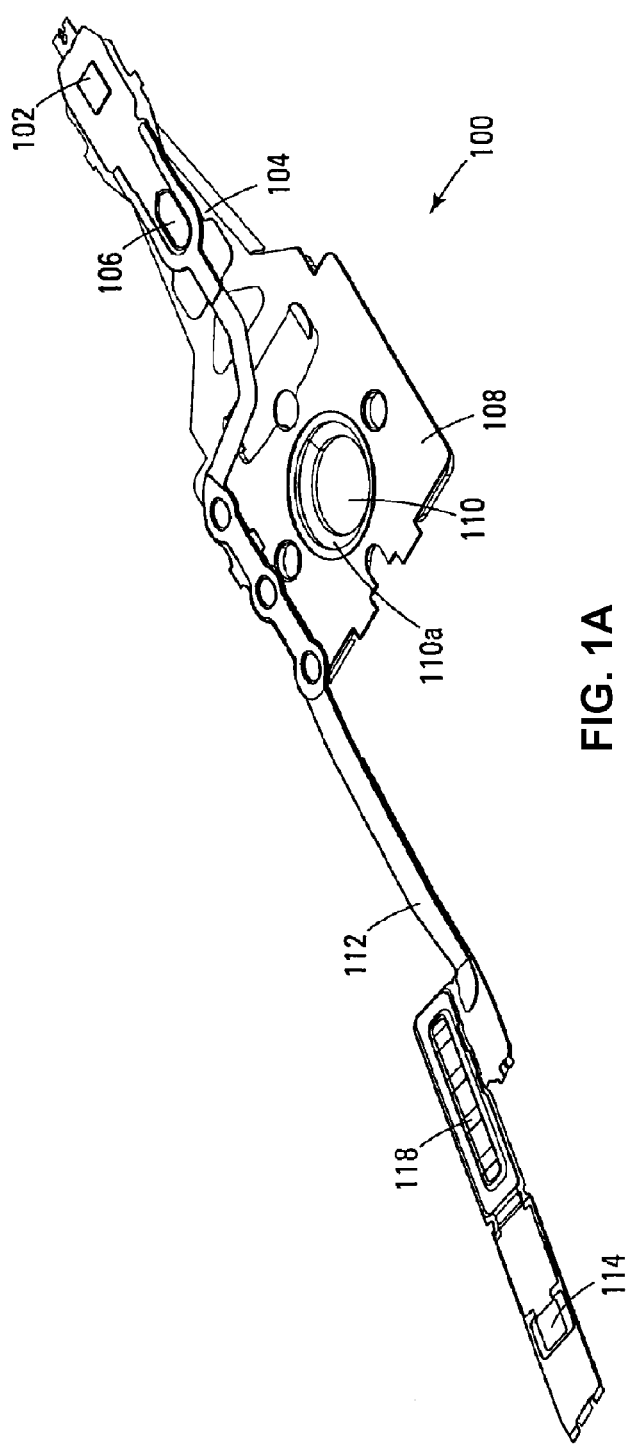
FIGS. 1A-1B illustrate an unmounted HGA.
Figure 1B:
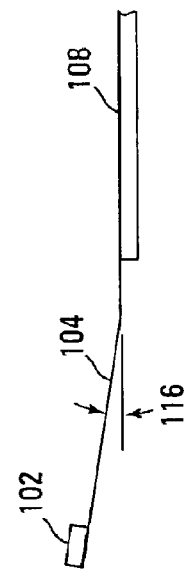

As shown in FIG. 1A, the basic components of HGA 100 are head 102, load beam 104, HGA reference feature 106, base plate 108, boss hole 110 with angled surface 110a, and flex circuit 112 with flex circuit pads 118 and shunt tab 114. Head 102 flies above the surface of a data storage disc and contains read and write transducers. As shown in FIG. 1B, load beam 104 is a thin, metal structure that has a bend, which provides the spring force to hold HGA 100 adjacent to the disc during operation. The angle of the bend with respect to base plate 108 is free state angle 116.

FIG. 1A shows base plate 108, which is retained during testing to permit manipulation and alignment of HGA 100, and eventually, is mechanically fastened into a disc drive. Boss hole 110 and HGA reference feature 106 are used for aligning HGA 100. As an example, HGA reference feature 106 may comprise one or more tooling holes. Flex circuit 112 and its components will subsequently be described in more detail.

HGA 100 may be tested prior to installation in disc drive. For example, a dynamic electrical tester including a rotating test disc may be used to test HGA 100 to ensure HGA 100 is suitable for installation in a disc drive. In some examples, a dynamic electrical testing does not require mounting an HGA on an intermediate mounting fixture. The absence of an intermediate mounting fixture in a process is referred to herein as an unmounted process. The small size and fragility of an HGA makes it necessary that unmounted processes be mechanically controlled. Techniques for unmounted or "blockless" testing of HGAs are disclosed in U.S. Pat. No. 7,529,635 to Anderson et al., titled, "METHOD AND APPARATUS FOR HEAD GIMBAL ASSEMBLY TESTING," issued May 5, 2009, the entire content of which is incorporated by reference herein. The techniques disclosed in U.S. Pat. No. 7,529,635 to Anderson et al. may be easily combined with the techniques for providing precise HGA alignment as disclosed herein.

Figure 2:
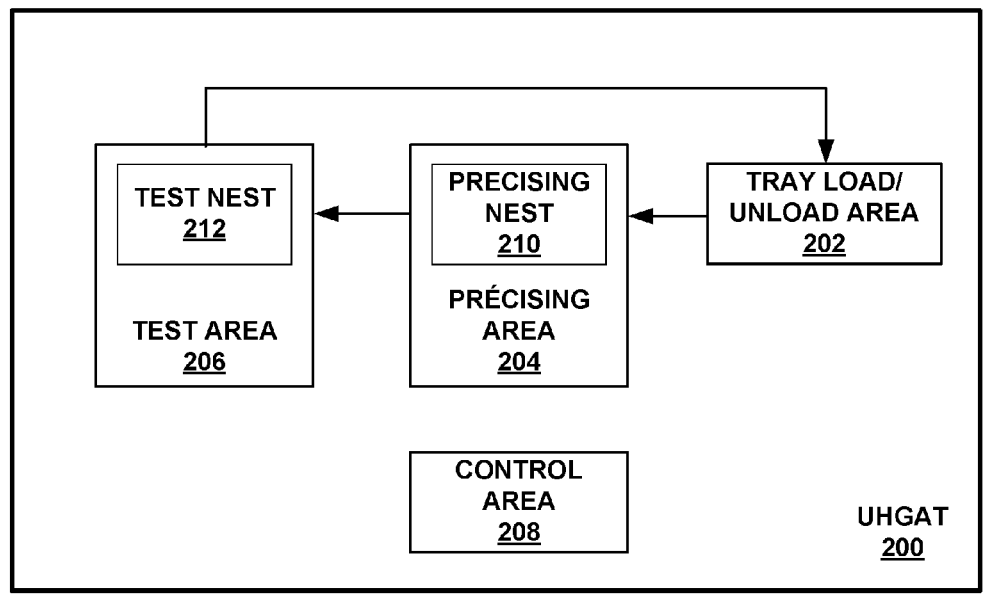
FIG. 2 is a block diagram illustrating an unmounted HGA tester (UHGAT) that facilitates dynamic electrical testing of HGAs without intermediate mounting fixtures.

FIG. 2 is a block diagram illustrating UHGAT 200, which facilitates dynamic electrical testing of HGAs without intermediate mounting fixtures. UHGAT 200 includes, but is not limited to, four main functional areas. Three of the functional areas are process areas: tray load/unload area 202, précising area 204 including précising nest 210, which aligns, de-shunts, and headsets the HGAs, and test area 206 including test nest 212, which interconnects the HGAs with preamplifiers and loads the HGAs to the test disc. The fourth functional area, control area 208, controls the UHGAT automation and eliminates the need for operator intervention during the UHGAT dynamic electrical test of the HGA.

UHGAT 200 includes linear actuators with end effectors to automatically transport HGAs between the functional areas. For example, the linear actuators may be pneumatic actuators and the end effectors may be vacuum end effectors. Servo controlled actuators can also be used instead of or in combination with pneumatic linear actuators to provide higher positioning precision and velocity control than with pneumatic linear actuators.

As shown in FIG. 2, the first processing area is tray load/unload area 202. At tray load/unload area 202, trays containing HGAs are loaded and unloaded, either manually by an operator or using an automated placement process. After tray load/unload area 202 is loaded with a tray including a plurality of HGAs, UHGAT 200 automatically identifies the HGAs by reading a radio frequency (RF) tag associated with or placed inside the tray. Once the trays have been loaded, UHGAT 200 picks an HGA from the tray using a vacuum of the end effector connected to the linear actuators.

When an HGA is removed from the tray it is moved to a second processing area, précising area 204, where it is aligned on précising nest 210, de-shunted and headset. After these operations are complete, the HGA is moved using the end effector from précising area 204 to a third processing area, test area 206. The steps that occur in the précising area 204 include moving the HGA above and then lowering it onto the précising nest 210. As the HGA is placed on the précising nest 210, pins align the HGA for eventual testing with the disc. Then the HGA is simultaneously de-shunted and headset at précising nest 210, and it is subsequently moved to test area 206.

Alignment of HGA 100 is critical for the dynamic electrical test because the position of the HGA on test nest 212 will affect the test results. Aligning each HGA at précising nest 210 eliminates misalignment caused by variation in HGA position in the tray and tray-to-tray differences. Précising nest 210 ensures that every HGA is aligned relative to the travel axis of the coarse positioning system in exactly the same way, regardless of the HGA's alignment coming out of the tray.

During transfer from précising area 204 to test area 206, the HGA maintains the alignment set on précising nest 210. After placement on test nest 212, flex circuit 112 (FIG. 1A) is aligned and moved down to make interconnect with a preamplifier. The preamplifier contacts are large flat gold contacts that cover the tolerance range of flex circuit 112's position. Dynamic electrical testing of the HGA begins once the HGA is in electrical communication with test area 206. For example, the HGA may be loaded onto a rotating test disc using a single-degree-of-freedom mechanism.

While the first HGA is being tested, the linear actuator moves the end effector back to tray load/unload area 202, and the next HGA is picked from the tray and brought to précising area 204. Once dynamic electrical testing of the first HGA is complete, the first HGA is replaced on test nest 212 with the second HGA, and the first HGA is returned to tray load/unload area 202. The same sequence continues until all of the parts in the trays have been tested.

In some instances, UHGAT 200 may include two or more end effectors on a single set of linear actuators in order to transport more than one HGA simultaneously. For example, when replacing a tested HGA on test nest 212 with the next HGA to be tested, having two end effectors on a single set of linear actuators allows picking up the tested HGA and replacing it with next HGA to be tested with minimal movement by the linear actuators.

Figure 3:
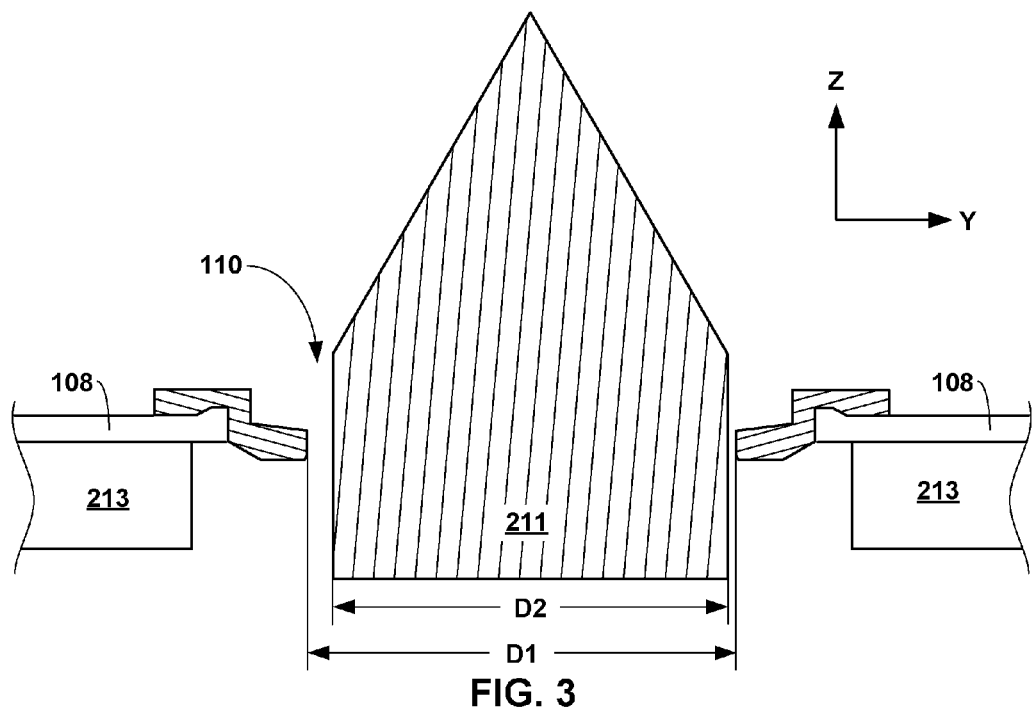
FIG. 3 illustrates a cross-sectional view of a conical alignment pin of a précising nest mated with a boss hole of an HGA.

FIG. 3 illustrates a cross-sectional view of conical alignment pin 211 of a précising nest, such as précising nest 210 (FIG. 2), mated with boss hole 110 in base plate 108 of HGA 100 (FIGS. 1A-1B). The précising nest also includes mounting platform 213, which facilitates precise positioning of base plate 108 in the Z-dimension. As data storage densities in disc drives increases, HGAs, such as HGA 100, must be more precisely located during testing. The error in positioning a HGA during testing is commonly referred to Reader/Writer Offset (RWO). A contributing factor to RWO for dynamic electrical testing techniques such as those disclosed in U.S. Pat. No. 7,529,635 to Anderson et al. occurs during an unmounted précising operation, which functions to precisely align a HGA prior to mounting the HGA on a test nest for dynamic electrical testing.

For example, as shown in FIG. 3, alignment pin 211 has an outer diameter D2 that is smaller than the inner diameter D1 of boss hole 110 in base plate 108 of HGA 100. The difference between D1 and D2 allows undesirable lateral movement in the X-Y plane of HGA 100 during an unmounted alignment operation at a précising nest, such as précising nest 210. The clearance between the outer diameter D2 of alignment pin 211 and the inner diameter D1 of boss hole 110 is necessary to allow boss hole 110 to fit over alignment pin 211 without interference during an alignment operation. As an example, in some systems, the difference between D1 and D2 may be from about 5 µm to about 20 µm. One technique for minimizing imprecise alignment of HGA 100 at a précising nest including alignment pin 211 is to bias boss hole 110 against one side of alignment pin 211 during the alignment at précising nest 210. In this manner, the position of HGA 100 at a précising nest including alignment pin 211 may be more precise than the lateral movement allowed by the difference between D1 and D2.

Figure 4A:
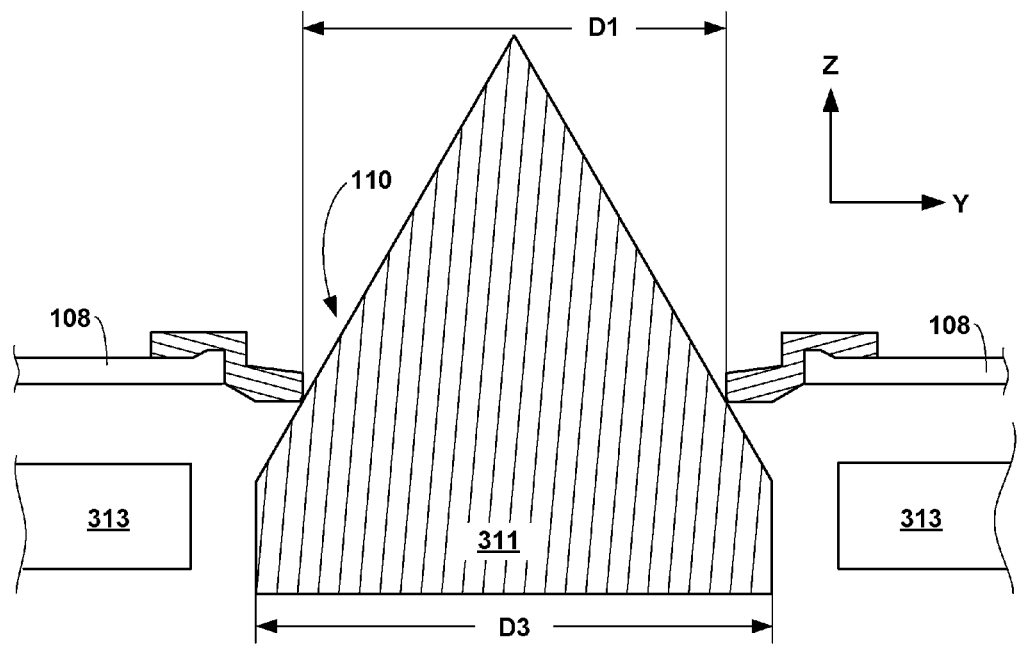
FIGS. 4A-4B illustrate a cross-sectional view of a compliant alignment pin of a précising nest mated with a boss hole of an HGA.
Figure 4B:
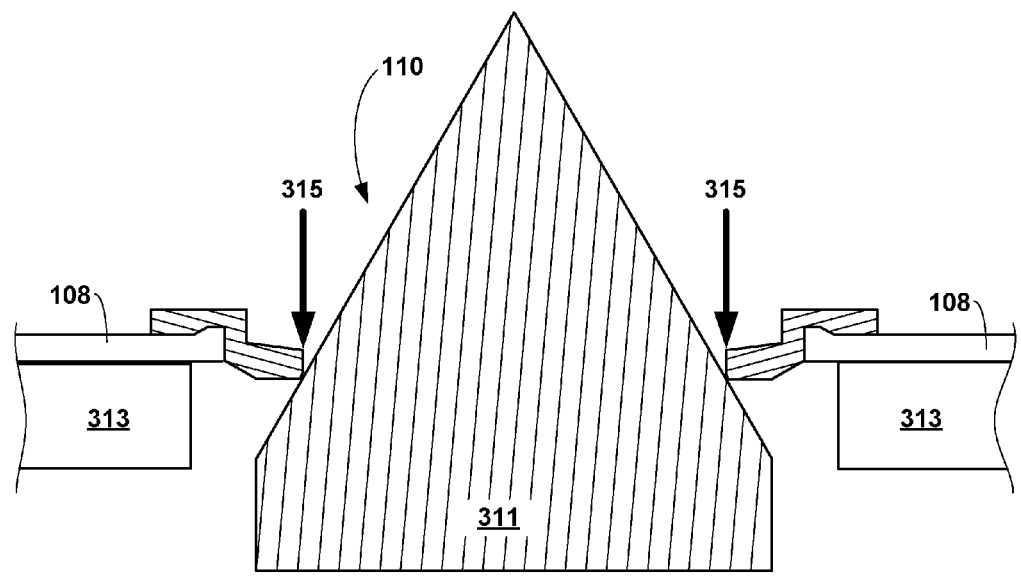

FIGS. 4A-4B illustrate a cross-sectional view of alignment pin 311 of a précising nest, such as précising nest 210, mated with boss hole 110 in base plate 108 of HGA 100 (FIGS. 1A-1B). Alignment pin 311 provides an alternative to alignment pin 211 (FIG. 3). Specifically, alignment pin 311 has a diameter D3 that is greater than the inner diameter D1 of boss hole 110. When aligning HGA 100 on a précising nest including alignment pin 311, base plate 108 slides over alignment pin 311 until the full perimeter of boss hole 110 fully contacts the tapered portion of alignment pin 311 as shown in FIG. 4A. Since there is no space between boss hole 110 and the tapered portion of alignment pin 311, alignment pin 311 provides greater X-Y plane positioning precision than alignment pin 211 (FIG. 3).

However, the tapered surface of alignment pin 311 does not provide a precise reference point in the Z-dimension. Instead, alignment pin 311 is compliant to allow base plate 108 of HGA 100 to register with mounting platform 313, which facilitates precise positioning of base plate 108 in the Z-dimension. More specifically, once boss hole 110 contacts the tapered surface of alignment pin 311, further downward motion of base plate 108 of HGA 100 in the Z-dimension moves alignment pin 311 in direction 315. This continues until base plate 108 registers with mounting platform 313 (as shown in FIG. 4B) to provide precise positioning of HGA 100 in the Z-dimension.

Boss hole 110 is deformable in order to facilitate a swaging operation for attachment to an actuator arm of a disc drive. For this reason, the resistance force of alignment pin 311 to movement in direction 315 is designed to be less than a force that would deform boss hole 110.

In order to facilitate precise positioning of base plate 108 of HGA 100 in the X-Y plane, compliant alignment pin 311 must move with precise and repeatable precision in direction 315. One technique for facilitate precise positioning of base plate 108 of HGA 100 in the X-Y plane with a compliant alignment pin is provided by précising nest 300 (FIGS. 5A-5B).

Figure 5A:
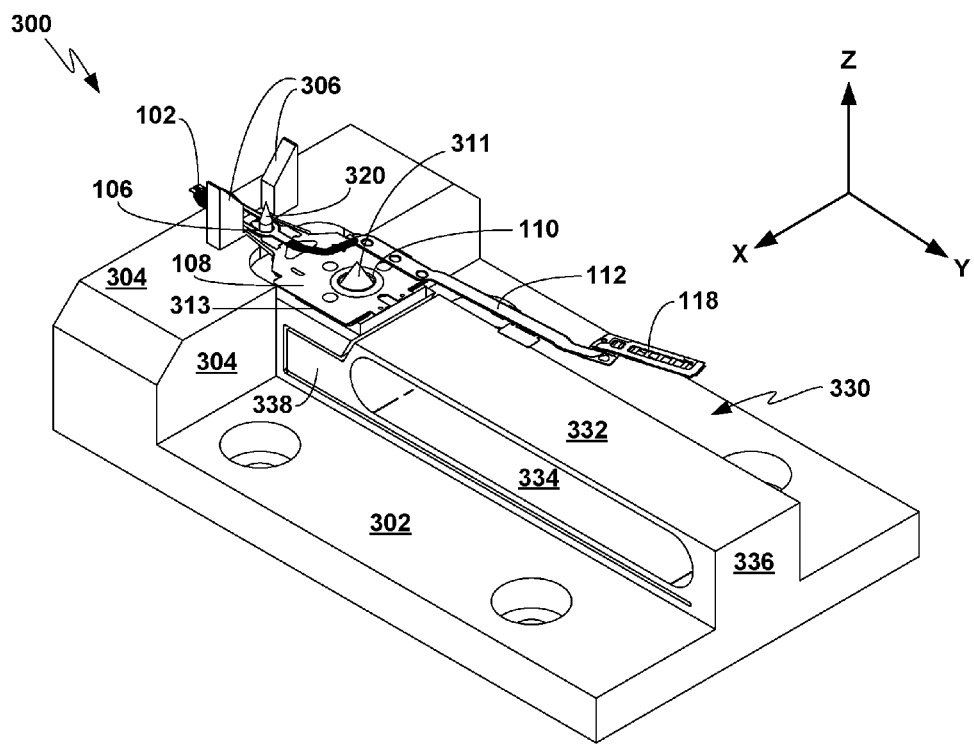
FIGS. 5A-5B illustrate a précising nest including a compliant alignment pin that maintains precise and repeatable positioning under deflection in the Z-dimension.
Figure 5B:
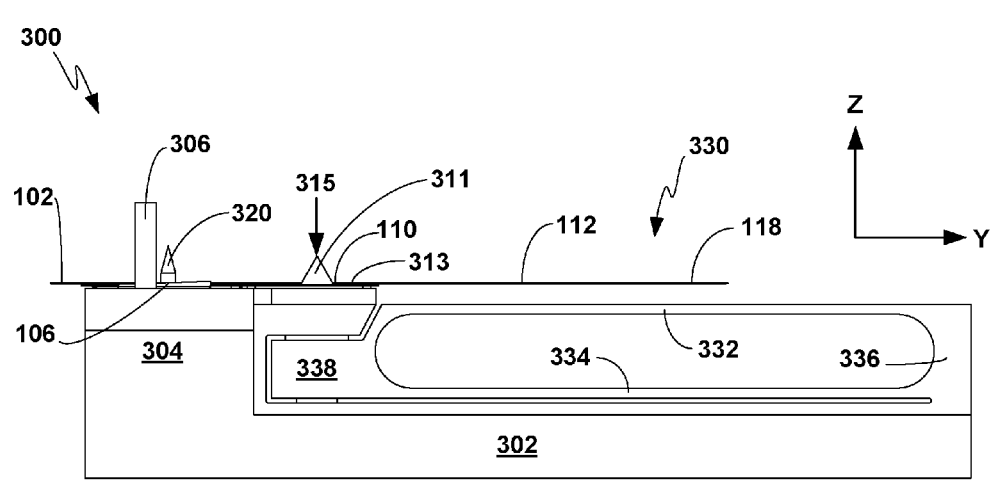

FIGS. 5A-5B illustrate HGA 100 being aligned on précising nest 300. Précising nest 300 includes stationary base 302, compliant alignment pin 310 and single-degree-of-freedom mechanism 330, which facilitates precise and repeatable positioning of compliant alignment pin 310 when under deflection in the Z-dimension. As examples, single-degree-of-freedom mechanism 330 may be a parallel beam or a four-bar linkage. In other examples, single-degree-of-freedom mechanism 330 may be a pivotable arm. Précising nest 300 is suitable for use as précising nest 210 as described with respect to FIG. 2.

HGA 100 is positioned on précising nest 300 so that boss hole 110 surrounds compliant alignment pin 311 and HGA reference feature 106 surrounds a front alignment pin 320. Both compliant alignment pin 311 and front alignment pin 320 are tapered pins located on top surface 304 of précising nest 300. FIGS. 5A-5B also show HGA 100's head 102 positioned between a pair of tapered pre-alignment guides 306 and extending beyond top surface 304 of précising nest 300.

Positioning HGA 100 on précising nest 300 occurs in the following manner. An end effector moves HGA 100 from tray load/unload area 202 (FIG. 2) to a position above précising nest 300 and lowers HGA 100 along the Z direction onto a set of alignment pins: front alignment pin 320 and compliant alignment pin 311. Front pre-alignment guides 306 set the skew, x, and y positions of HGA 100.

As HGA 100 is lowered along the Z direction by the end effector, boss hole 110 slips over the compliant alignment pin 311 and the HGA reference feature 106 slips over the front alignment pin 320. As HGA 100 travels downward along the Z direction, the taper on the alignment pins 311, 320 pulls boss hole 110 and the HGA reference feature 106 into their proper locations. The tapered pins allow for some misalignment of HGA 100 to précising nest 300. The HGA alignment is completed while HGA 100 is lowered onto the pins causing a relative motion between the HGA's base plate 108 and the end effector until boss hole 100 fully registers on the tapered portion of compliant alignment pin 311. This relative motion does not harm HGA 100 or the end effector because the only force on HGA 100 while being lowered onto the pins is due to the vacuum created by the end effector. The vacuum force is sufficient to hold HGA 100 securely in the Z direction while still allowing horizontal translation along the X direction as HGA 100 is pushed into position by the tapered pins. Then HGA 100 is lowered further deflecting compliant alignment pin 311 in the Z direction until base plate 108 registers with mounting platform 313.

Single-degree-of-freedom mechanism 330 supports compliant alignment pin 311 and facilitates precise and repeatable positioning of compliant alignment pin 310 when under deflection in the Z-dimension. As a parallel beam, single-degree-of-freedom mechanism 330 includes two flexures 332, 334 and two stiff end portions 336, 338. End portion 336 is fixed relative to stationary base 302, whereas end portion 338 is fixed relative to compliant alignment pin 311. The force of the linear actuator placing boss hole 110 over compliant alignment pin 311 is sufficient to overcome the spring force of flexures 332, 334 to allow base plate 108 of HGA 100 to register with mounting platform 313. Mounting platform 313 is fixed relative to stationary base 302 to provide for precise positioning of HGA 100 in the Z-dimension.

Using boss hole 110 and HGA reference feature 106 for alignment provides for accurate alignment in part because these features also are used as an alignment datum when head 102 is attached to HGA 100 in production. Once the alignment is complete, HGA 100 is held firmly against précising nest 300 by the end effector to prevent any movement during subsequent de-shunt and headset operations.

Pre-alignment guides 306 are also tapered and provide a rough alignment of HGA 100 prior to it reaching front alignment pin 320 during the downward movement along the Z direction of the end effector. Pre-alignment guides 306 ensure that HGA 100 is close enough in alignment that HGA reference feature 106 will slip over the taper of the front alignment pin 320 as HGA 100 is lowered on précising nest 300.

After HGA 100 is aligned in précising nest 300, HGA 100 may be de-shunted and headset. Techniques for de-shunting and headsetting HGAs on a précising nest are disclosed in U.S. Pat. No. 7,529,635 to Anderson et al. These techniques may be utilized with a précising nest including a compliant alignment pin as disclosed herein.

After completion of the alignment, de-shunt, and headset operations, the aligned HGA 100 is moved to a test area, such as test area 206 (FIG. 2), for a dynamic electrical test. The aligned HGA 100 maintains its alignment from précising nest 300 in the transfer to the test area. The precise alignment provided by précising nest 300 improves the accuracy of dynamic electrical testing by further limiting any variation in alignment between HGAs aligned at précising nest 300.

The implementations described above and other implementations are within the scope of the following claims.

The invention claimed is:

1. A system for aligning a head gimbal assembly (HGA), the system comprising:
   a compliant alignment pin including a tapered portion having a maximum diameter larger than a diameter of a boss hole in a base plate of the HGA, wherein the compliant alignment pin is deflectable in a Z-dimension;
   a second alignment pin configured to register with an HGA reference feature of the HGA when the boss hole of the HGA registers with the compliant alignment pin to precisely align the HGA relative to the compliant alignment pin and the second alignment pin; and
   a single-degree-of-freedom mechanism coupled to the compliant alignment pin, wherein the single-degree-of-freedom mechanism supports the compliant alignment pin and facilitates precise and repeatable positioning of the compliant alignment pin when under deflection in the Z-dimension.

2. The system of claim 1, further comprising actuator that locates the boss hole over the tapered portion of the compliant alignment pin and moves the HGA along the Z-dimension such that boss hole registers with the tapered portion of the compliant alignment pin, and wherein the actuator moves the HGA further along the Z-dimension to deflect the compliant alignment pin in the Z-dimension.

3. The system of claim 2, further comprising an alignment guide, wherein the actuator moves the HGA along the Z-dimension such that the HGA contacts the alignment guide to roughly align the boss hole with respect to the compliant alignment pin and the HGA reference feature with respect to the second alignment pin.

4. The system of claim 2, wherein the actuator comprises a vacuum that holds the HGA.

5. The system of claim 2, wherein the actuator is a pneumatic linear actuator.

6. The system of claim 2, further comprising:
   a rotating disc; and
   a single-degree-of-freedom mechanism that loads the HGA on the rotating disc.

7. The system of claim 1, wherein the second alignment pin is tapered.

8. The system of claim 1, wherein the second alignment pin extends further than the compliant alignment pin.

9. A method for aligning a head gimbal assembly (HGA) comprising:
  positioning a boss hole in a base plate of an HGA over a compliant alignment pin including a tapered portion having a maximum diameter larger than a diameter of the boss hole in the base plate of the HGA,
  moving the HGA in the Z-dimension such that a perimeter of the boss hole contacts the tapered portion of the compliant alignment pin; and
  moving the HGA further in the Z-dimension to deflect the compliant alignment pin in the Z-dimension.

10. The method of claim 9, wherein the compliant alignment pin is coupled to a single-degree-of-freedom mechanism, wherein the single-degree-of-freedom mechanism supports the compliant alignment pin and facilitates precise and repeatable positioning of the compliant alignment pin when under deflection in the Z-dimension.

11. The method of claim 9, wherein an actuator positions the boss hole over the tapered portion of the compliant alignment pin and moves the HGA along the Z-dimension.

12. The method of claim 9, further comprising positioning an HGA reference feature of the HGA over a second alignment pin, wherein moving the HGA in the Z-dimension precisely aligns the HGA relative to the compliant alignment pin and the second alignment pin.

13. The method of claim 12, wherein the actuator moves the HGA along the Z-dimension such that the HGA contacts an alignment guide to roughly align the boss hole with respect to the compliant alignment pin and the HGA reference feature with respect to the second alignment pin.

14. The method of claim 12, wherein the second alignment pin is tapered.

15. The method of claim 9, further comprising deshunting the HGA.

16. The method of claim 9, further comprising:
  loading the HGA on a rotating disc; and
  testing the HGA by reading from and/or writing to the rotating disc.

* * * * *